United States Patent
Huber et al.

(10) Patent No.: US 7,689,621 B1
(45) Date of Patent: Mar. 30, 2010

(54) MULTI-DIMENSIONAL SPATIAL INDEX FOR A GEOGRAPHIC DATABASE

(75) Inventors: Thomas Huber, Des Plaines, IL (US); William Gale, Oak Park, IL (US)

(73) Assignee: Navteq North America, LLC, Chicago, IL (US)

( * ) Notice: Subject to any disclaimer, the term of this patent is extended or adjusted under 35 U.S.C. 154(b) by 0 days.

(21) Appl. No.: 09/706,937

(22) Filed: Nov. 6, 2000

(51) Int. Cl.
G06F 7/00 (2006.01)

(52) U.S. Cl. .................. 707/743; 707/918; 707/919; 707/920

(58) Field of Classification Search .............. 707/1–10, 707/100–102, 104.1, 200–201, 743, 918, 707/919, 920; 701/205, 208, 200; 340/995.1
See application file for complete search history.

(56) References Cited

U.S. PATENT DOCUMENTS

| | | | | |
|---|---|---|---|---|
| 4,811,244 A | * | 3/1989 | Shimada et al. | 345/443 |
| 4,873,513 A | * | 10/1989 | Soults et al. | 345/27 |
| 5,121,326 A | * | 6/1992 | Moroto et al. | 701/212 |
| 5,168,452 A | * | 12/1992 | Yamada et al. | 701/202 |
| 5,365,451 A | * | 11/1994 | Wang et al. | 701/213 |
| 5,475,802 A | * | 12/1995 | Wescott et al. | 345/441 |
| 5,499,366 A | * | 3/1996 | Rosenberg et al. | 707/4 |
| 5,544,052 A | * | 8/1996 | Fujita et al. | 702/5 |
| 5,701,467 A | * | 12/1997 | Freeston | 707/100 |
| 5,710,915 A | | 1/1998 | McElhiney | 707/3 |
| 5,781,906 A | * | 7/1998 | Aggarwal et al. | 707/102 |
| 5,848,131 A | * | 12/1998 | Shaffer et al. | 379/88.2 |
| 5,930,474 A | * | 7/1999 | Dunworth et al. | 709/217 |
| 5,953,722 A | * | 9/1999 | Lampert et al. | 707/100 |
| 5,968,109 A | * | 10/1999 | Israni et al. | 701/208 |
| 5,974,419 A | * | 10/1999 | Ashby | 707/100 |
| 6,049,755 A | * | 4/2000 | Lou et al. | 701/207 |
| 6,119,065 A | * | 9/2000 | Shimada et al. | 701/201 |
| 6,122,628 A | * | 9/2000 | Castelli et al. | 707/5 |
| 6,125,367 A | * | 9/2000 | Na | 707/104.1 |
| 6,134,541 A | * | 10/2000 | Castelli et al. | 707/2 |
| 6,161,105 A | * | 12/2000 | Keighan et al. | 707/100 |
| 6,202,023 B1 | * | 3/2001 | Hancock et al. | 701/201 |

(Continued)

OTHER PUBLICATIONS

Hjaltason, G.R., and H. Samet, "ranking in Spatial databases." In Advances in Spatial Databases-4$^{th}$ International Symposium, Portland, Maine, Aug. 1995, pp. 83-95.*

(Continued)

*Primary Examiner*—Miranda Le
(74) *Attorney, Agent, or Firm*—Jon D. Shutter; Frank J. Kozak; Lisa M. Schoedel

(57) ABSTRACT

A multi-dimensional spatial index includes at least two dimensions that define physical boundaries of the features represented by the indexed data. In addition, the multi-dimensional spatial index includes at least one additional dimension that represents another property. The other property is an orthogonal, non-spatial property. The other property may be a property of the features represented by the indexed data or the other property may be a property of the data. The other property represented by the additional dimension may include: granularity, distance, altitude, scale bounds within which each spatial entity is significant, or other property. The multi-dimensional spatial index is applicable to the storage, retrieval, visualization and traversal of spatial data sets.

12 Claims, 7 Drawing Sheets

HOMOGENEOUS MULTI-DIMENSIONAL SPATIAL INDEX WITH GRANULARITY AS AN ADDITIONAL DIMENSION

U.S. PATENT DOCUMENTS

| | | | |
|---|---|---|---|
| 6,252,605 B1* | 6/2001 | Beesley et al. | 345/441 |
| 6,256,581 B1* | 7/2001 | Fujii et al. | 701/202 |
| 6,263,276 B1* | 7/2001 | Yokoyama et al. | 701/207 |
| 6,292,745 B1* | 9/2001 | Robare et al. | 701/208 |
| 6,295,502 B1* | 9/2001 | Hancock et al. | 701/201 |
| 6,308,177 B1* | 10/2001 | Israni et al. | 707/100 |
| 6,317,741 B1* | 11/2001 | Burrows | 707/5 |
| 6,327,535 B1* | 12/2001 | Evans et al. | 701/300 |
| 6,335,695 B1* | 1/2002 | Kawasaki | 340/995.14 |
| 6,381,605 B1* | 4/2002 | Kothuri et al. | 707/100 |
| 6,438,269 B1* | 8/2002 | Kim et al. | 382/261 |
| 6,456,299 B1* | 9/2002 | Trombley | 345/629 |
| 6,460,026 B1* | 10/2002 | Pasumansky | 707/1 |
| 6,470,287 B1* | 10/2002 | Smartt | 702/102 |
| 6,470,344 B1* | 10/2002 | Kothuri et al. | 707/100 |
| 6,484,179 B1* | 11/2002 | Roccaforte | 707/102 |
| 6,487,495 B1* | 11/2002 | Gale et al. | 701/209 |
| 6,600,841 B1* | 7/2003 | Friederich et al. | 382/305 |
| 6,603,470 B1* | 8/2003 | Deering | 345/419 |
| 6,609,062 B2* | 8/2003 | Hancock | 701/200 |
| 6,636,802 B1* | 10/2003 | Nakano et al. | 701/208 |
| 6,650,998 B1* | 11/2003 | Rutledge et al. | 701/211 |
| 6,684,219 B1* | 1/2004 | Shaw et al. | 707/103 R |
| 6,703,947 B1* | 3/2004 | Wallner | 341/50 |
| 6,732,120 B1* | 5/2004 | Du | 707/104.1 |
| 6,772,142 B1* | 8/2004 | Kelling et al. | 707/3 |
| 6,915,289 B1* | 7/2005 | Malloy et al. | 707/2 |
| 7,151,548 B1* | 12/2006 | Hirono | 345/629 |
| 7,266,560 B2* | 9/2007 | Lampert et al. | 707/101 |
| 2001/0011270 A1* | 8/2001 | Himmelstein et al. | 707/3 |
| 2001/0011352 A1* | 8/2001 | O'Mahony | 713/200 |
| 2001/0043745 A1* | 11/2001 | Friederich et al. | 382/232 |
| 2001/0051851 A1* | 12/2001 | Suzuki et al. | 701/208 |
| 2002/0004752 A1* | 1/2002 | Kuma | 705/23 |
| 2004/0205517 A1* | 10/2004 | Lampert et al. | 715/502 |
| 2006/0253481 A1* | 11/2006 | Guido et al. | 707/100 |

OTHER PUBLICATIONS

Matsuyama et al., A File Organization for Geographic Information Systems Based on Spatial Proximity, Computer Vision Graphics and Image Processing 26, 303-318 (1983-84).

Frosh, Randy, A Method of Accessing Large Spatial Databases, GIS/LIS '89 Conference, Orlando, FL. (1989).

Samnet, Hanan, Strategies for Optimizing the Use of Redundancy in Spatial Databases, The Design and Analysis of Spatial Data Structure, ISBN 0-201-50255-0, Chapter 2.4 (<1996).

Bentley, Jon L., Multidimensional Binary Search Trees in Data Applications, IEEE Transactions on Software Engineering, vol. SE-5, No. 4, pp. 333-340. (Jul. 1979).

* cited by examiner

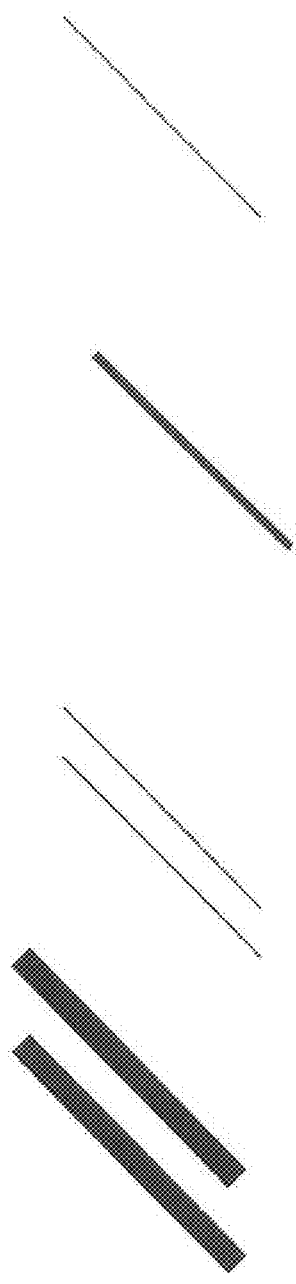
SCALE-DEPENDENT REPRESENTATIONS OF A SPATIAL ENTITY
FIG. 6A  1:5,000
FIG. 6B  1:10,000
FIG. 6C  1:25,000
FIG. 6D  1:50,000

100,000 M 50,000 M

DISTANCE-DEPENDENT REPRESENTATIONS OF A SPATIAL ENTITY 10,000 M

MULTI-DIMENSIONAL SPATIAL INDEX FOR A GEOGRAPHIC DATABASE

BACKGROUND OF THE INVENTION

The present invention relates to geographic databases and more particularly, the present invention relates to an index that is useful for accessing and using data in geographic database.

Geographic data are used for various purposes in various different kinds of computing platforms. Geographic data are used in in-vehicle navigation systems to provide drivers of the vehicles with various useful navigation-related and map-related features. Geographic data are also used by navigation-related and map-related services on the Internet.

When using geographic data there is often a need to access the data spatially, i.e., to find data based on the locations of the geographic features represented thereby. One way to access geographic data spatially is to use a spatial index, such as a k-d-tree index. A k-d-tree index has a tree structure, having a root node, leaf nodes and intermediate nodes between the root node and the leaf nodes. Each node in a k-d-tree structure is part of a parent-child relationship. Each parent node includes control information from which one (of two or more) child nodes associated with the parent node can be distinguished based on a search key.

When a k-d-tree is used as a spatial index, the root node and intermediate nodes include two dimensional spatial boundary information (e.g., latitude and longitude) that relate to the indexed item of data. The indexed item of data can be an item of data that represents a single geographic feature. Alternatively, the indexed item of data can be a collection of data items that represent geographic features encompassed within a bounded area. As an example, a k-d-tree can be used as an index to collections (i.e., parcels) of data that represent geographic features located within separate rectangular areas. The nodes of a k-d-tree used for this purpose include the boundary information (i.e., maximum latitude, maximum longitude, minimum latitude, minimum longitude) that define the separate rectangular areas that contain the geographic features represented by the data in the respective parcels.

A k-d-tree used for organizing geographic data is described in U.S. Pat. No. 5,953,722, the entire disclosure of which is incorporated by reference herein.

When using geographic data, it is sometimes useful to access the data at different levels of detail (or granularity). Map display and route calculation are examples of two applications in which geographic data are sometimes used at different levels of detail. For example, when using geographic data with a map display application to display a map of an area, a greater level of detail is used for relatively larger scale maps and a lesser level of detail is used for relatively smaller scale maps. Similarly, when performing route calculation, it is often preferable not to consider smaller, low volume roads when determining a route between an origin and a destination.

In order to facilitate navigation functions that access and use geographic data at different levels of detail, data that represent geographic features are sometimes organized into layers based on a rank associated with the represented features. The lowest rank (e.g., 0) is associated with those features that are represented only when the finest level of detail is desired. In the case of roads, the lowest rank may be associated with side streets and alleys. On the other hand, the highest rank (e.g., 4) is associated with the most important features, i.e., those that would be displayed even at the coarsest level of detail. In the case of roads, the highest rank may be associated with expressways and major arterial roads.

When data representing geographic features are organized into layers, the lowest layer (e.g., 0) includes data representing geographic features of all ranks (e.g., 0-4). A highest layer (e.g., 4) includes data representing geographic features of only the highest rank (e.g., 4). Each other layer includes only those data that represent those geographic features of the associated rank and higher ranks. For example, layer 2 includes data that represent geographic features having ranks 2, 3 and 4. Layer 2 excludes data that represents geographic features of ranks 0 and 1. When data representing geographic features are organized into layers in this manner, a lowest layer has the greatest granularity and the highest layer has the least granularity.

These layers can exist as separate collections of the geographic data. When a navigation function requires the geographic data with a high level of detail, a lower layer is accessed and used. On the other hand, when a navigation function requires the geographic data with a low level of detail, a higher layer is accessed and used.

When data representing geographic features are organized into separate layers of granularity, a k-d-tree can be used to access the data spatially. A separate k-d-tree is used for each layer.

FIG. 1 shows a database structure 100 in which the data are organized into separate layers, labeled 0, 1, and 2. Each separate layer includes a separate collection of the geographic data, with layer 0 including the data that represent geographic features ranked 0, 1 and 2, layer 1 including the data that represent the geographic features ranked 1 and 2, and layer 2 including only the data that represent the geographic features ranked 2. Each separate layer also includes its own k-d-tree indexing information. Because each lower layer includes all the items of data represented in all higher layers, many items of data that represent the same feature are physically stored more than once. As an example, note that the item of data in the box labeled with an "x" appears in layer 0, layer 1 and layer 2.

An index for data can be implemented as either homogeneous or non-homogeneous. A homogeneous index appends the control information about related items of data to each indexed item of data. The k-d-tree structure in FIG. 1 is an example of an implementation of a homogeneous index. In the embodiment of FIG. 1, appended to each indexed item of data in the database 100 is the control information that indicates the related items of data. A homogeneous index provides advantages with relatively small data sets, e.g., those that fit entirely within a given computer's memory.

A non-homogeneous spatial index maintains the indexing data in a collection of small records that are separate from the indexed items of data. A non-homogeneous index is useful with relatively large data sets, i.e., those that exceed a given computer's memory. A non-homogeneous index has the benefits of being constructed and maintained separate from the indexed objects and of requiring relatively little space.

A homogeneous index and a non-homogeneous may be used together in a single database. A single database can include a non-homogeneous index maintained separate from the data being indexed and can also contain homogeneous index information appended to items of data.

A k-d-tree index (either homogeneous or non-homogeneous) used with a layered database works well for many applications. However, there is room for improvement. For example, it may be desired to provide more granularity, i.e., more layers or ranks of data. Further, it may be desired to make the indexing structure more flexible. Still further, it may be desired to index on additional properties of the data or the represented features.

SUMMARY OF THE INVENTION

To address these and other objectives, the present invention comprises a multi-dimensional spatial index for data that represent geographic features. The multi-dimensional spatial index includes at least two dimensions that define physical boundaries of the geographic features represented by the indexed data. In addition, the multi-dimensional spatial index includes at least one additional dimension that represents another property. The other property is an orthogonal, non-spatial property. The other property may be a property of the geographic features represented by the indexed data or the other property may be a property of the data. The other property represented by the additional dimension may include: granularity, distance, altitude, scale bounds within which each spatial entity is significant, creation date of the data, expiration date of the data or other property. The multi-dimensional spatial index is applicable to the storage, retrieval, visualization and traversal of spatial data sets.

BRIEF DESCRIPTION OF THE DRAWINGS

FIGS. 6A-6D show the different ways that a road segment can be displayed at different scales according to the embodiment in FIG. 5.

DETAILED DESCRIPTION OF THE PRESENTLY PREFERRED EMBODIMENTS

I. First Embodiment

Granularity Added as a Dimension to a k-d-Tree Index

Figure 2:
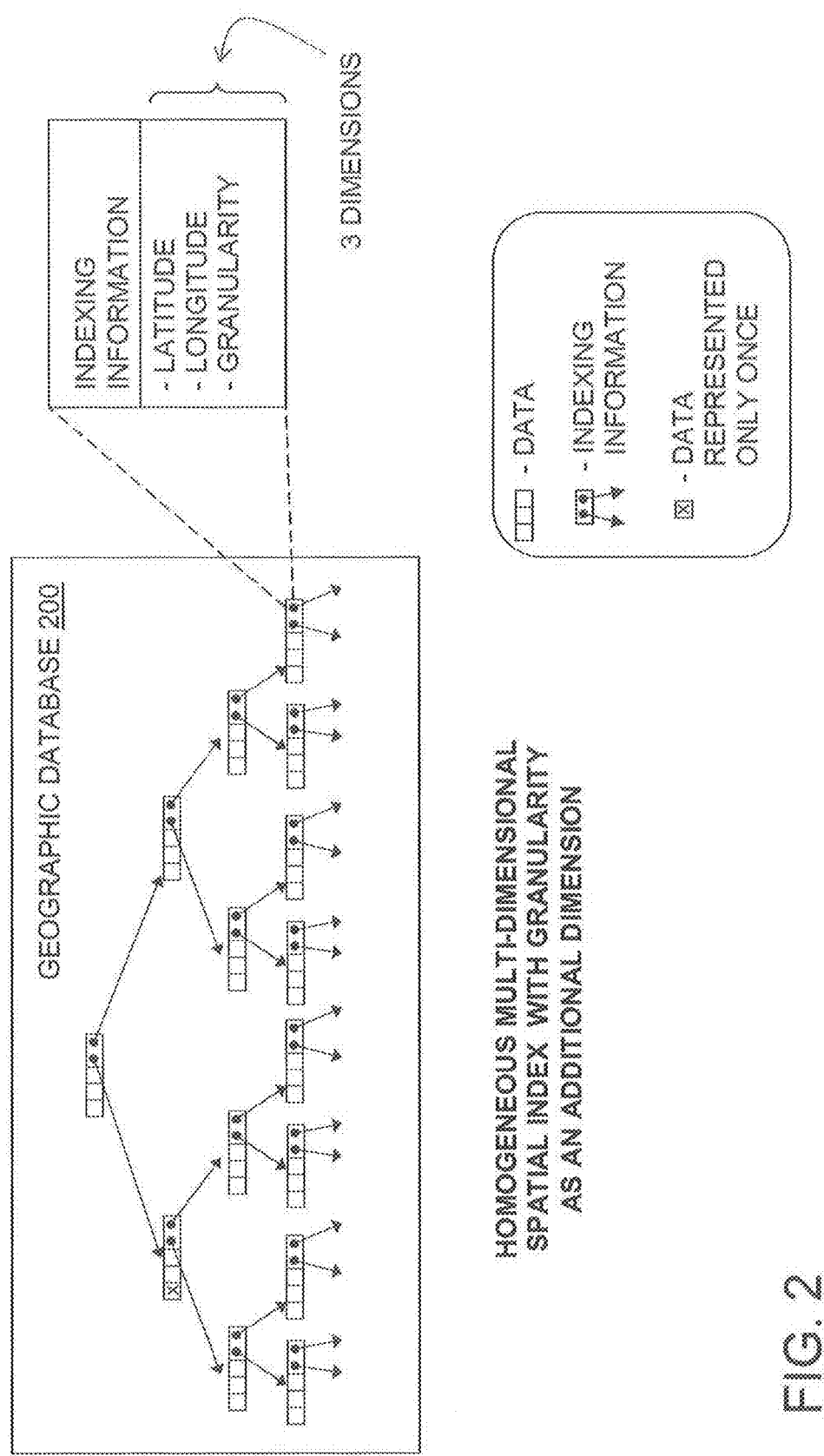
FIG. 2 is a diagram illustrating a first embodiment of a database for geographic data with a multi-dimensional index structure having at least three dimensions.

FIG. 2 is a diagram illustrating a first embodiment. In FIG. 2, data contained in a geographic database 200 are organized using a multi-dimensional k-d-tree index having at least three dimensions. Because the multi-dimensional k-d-tree index is a spatial index, two of the three dimensions are used to index the data spatially. In the multi-dimensional k-d-tree index in FIG. 2, the two dimensions used to index the data spatially define latitude and longitude boundaries for the items of data being indexed.

In addition to the two dimensions used to index the data spatially, the multi-dimensional k-d-tree in the embodiment of FIG. 2 includes at least one more dimension. In addition to the two dimensions used to index the data spatially, the multi-dimensional k-d-tree in FIG. 2 includes a third dimension. The third dimension is used to index another property of the data or of the geographic features being represented. In this embodiment, the third dimension is used as an index for granularity.

Figure 1:
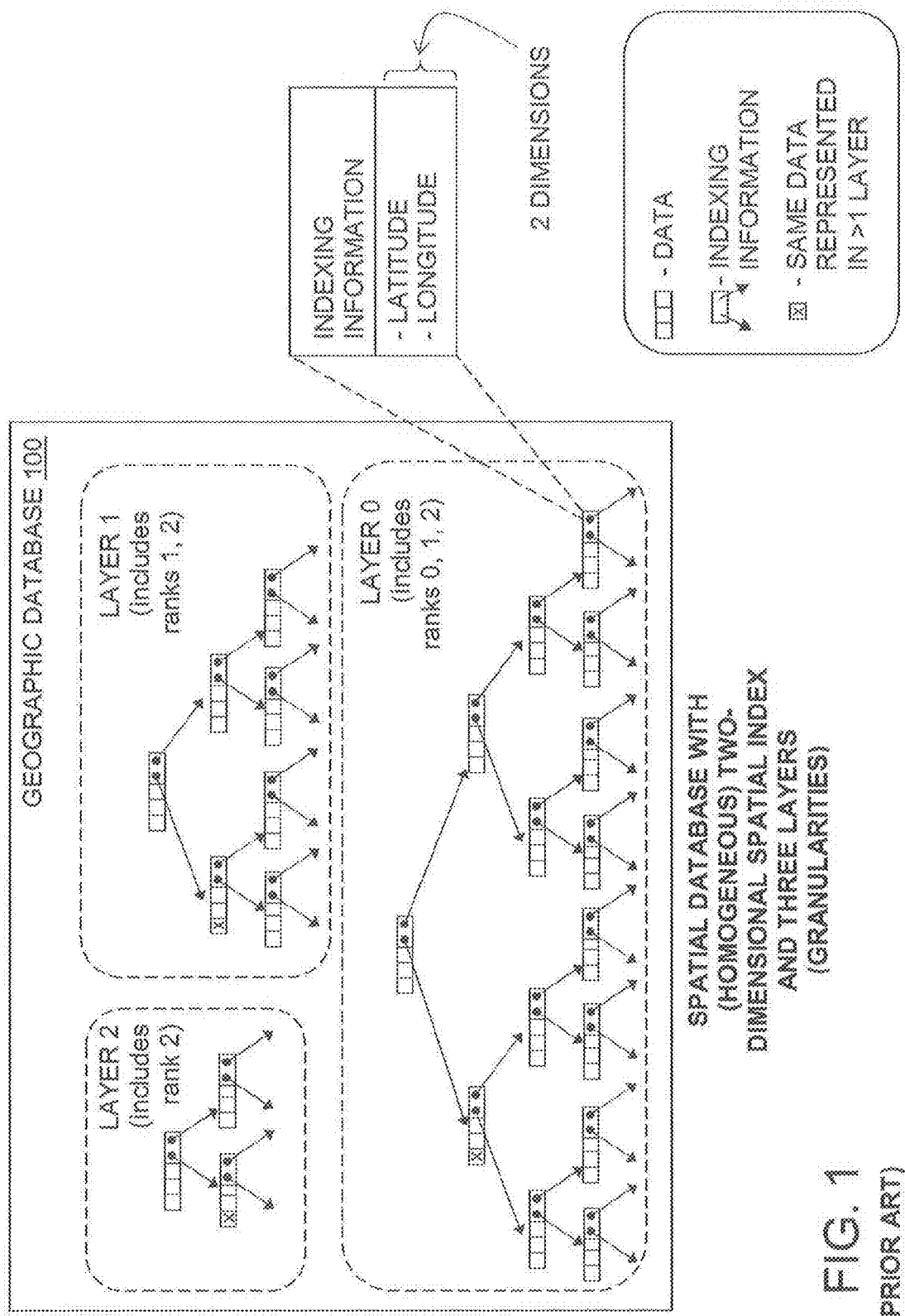
FIG. 1 is a diagram illustrating a conventional k-d-tree structure for geographic data.

In the embodiment of FIG. 2, the granularity indexing information in the multi-dimensional k-d-tree is used to represent three ranks of data. Because rank information is incorporated in the multi-dimensional k-d-tree in the embodiment of FIG. 2, there is no need to provide separate layers of the data, as in the database shown in FIG. 1. Accordingly, a data item which is stored three times in the embodiment of FIG. 1 (as shown by the three "x"s) can be stored once in the embodiment shown in FIG. 2 (as shown with the one "x").

As mentioned above, an index can be implemented homogeneously or non-homogeneously. In the embodiment of FIG. 2, the multi-dimensional k-d-tree index is implemented homogeneously, i.e., the indexing information is appended to the data items being indexed.

The granularity indexing information used to represent three ranks of data in the multi-dimensional k-d-tree in the embodiment of FIG. 2 is not restricted to integer values of rank (i.e., 0, 1, 2, etc.), but may have non-integer values as well (e.g., 0-0.99, 1.00-1.99, 2.00-2.99, etc.). Thus, the multi-dimensional k-d-tree index allows a continuous range of rank values, and therefore greater granularity.

In the embodiment of the multi-dimensional k-d-tree index in FIG. 2, two dimensions are used for spatial organization and one dimension is used for granularity for a total of three dimensions. Alternatively, the data set 200 can be implemented using a six-dimensional k-d-tree. According to this alternative, the six dimensions include four dimensions used for spatial indexing plus two dimensions for the granularity. The four dimensions used for spatial indexing correspond to the boundaries (i.e., minimum latitude, minimum longitude, maximum latitude, and maximum longitude) for each two-dimensional item of data being indexed (i.e., for a rectangular area, its four physical bounds). The two additional dimensions, which are used for the granularity property, can be used to define granularity ranges for each item of data being indexed (e.g., 0-0.99, 1.00-1.99, 2.00-2.99, etc.)

In the embodiment of FIG. 2, the multi-dimensional index includes than three dimensions. In alternative embodiments, the multi-dimensional index may include more than three dimensions. According to alternative embodiments, the multi-dimensional index can include four or more than dimensions. According to these alternative embodiments, two dimensions of the four or more dimensions are used for spatial indexing of the data items being indexed. The other two or more dimensions are used for indexing the items of data with respect to additional properties of the data or the represented geographic features.

II. Second Embodiment

Granularity Added as a Dimension to a Non-Homogeneous k-d-Tree

Figure 3:
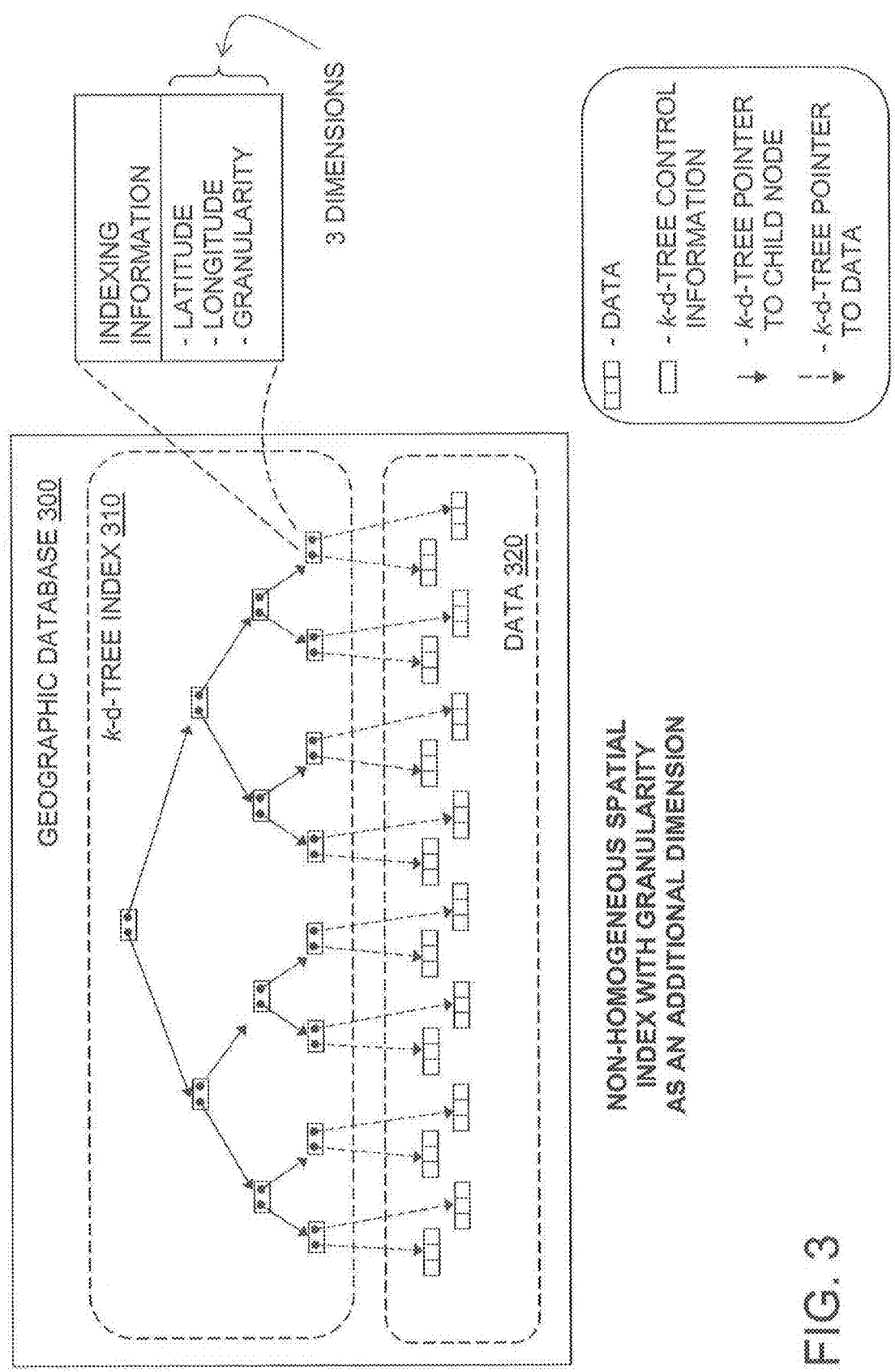
FIG. 3 is a diagram illustrating a second embodiment of a database for geographic data with a multi-dimensional index structure having at least three dimensions.

FIG. 3 shows another embodiment of a multi-dimensional k-d-tree index that has at least three dimensions and which is used for indexing data that represent geographic features. In FIG. 3, a database 300 for geographic data uses a multi-dimensional k-d-tree index 310. As stated in the Background, an index can be implemented as either homogeneous or non-homogeneous. In the embodiment of FIG. 3, the multi-dimensional k-d-tree index 310 is implemented as a non-homogeneous index. Accordingly, the multi-dimensional k-d-tree index 310 is maintained separate from the items of data 320 being indexed.

Like the homogeneous multi-dimensional k-d-tree index described in FIG. 2, the non-homogeneous multi-dimensional k-d-tree index 310 in FIG. 3 is a spatial index. Therefore, two of the three dimensions of the non-homogeneous multi-dimensional k-d-tree index 310 are used for spatially indexing the data 320. In addition to the two dimensions used to index the data spatially, the multi-dimensional k-d-tree index 320 in the embodiment of FIG. 3 includes at least one more dimension. In this embodiment, the additional dimension is used as an index for granularity.

Like the multi-dimensional k-d-tree index in FIG. 2, the multi-dimensional k-d-tree index 310 in FIG. 3 can be implemented using six-dimensions, i.e., four dimensions for spatial indexing plus two dimensions for granularity.

III. Alternative Embodiments

A. Other Properties Added as a Dimension to a Non-Homogeneous k-d-Tree

In the embodiments described in FIGS. 2 and 3, the additional property included as a dimension in the multi-dimensional k-d-tree index was granularity. Granularity is not the only property that can be used as the additional dimension. Instead of granularity, the additional dimension included in the multi-dimensional k-d-tree index can include any other property of the data. Some of the other properties include the following:

(1) distance,
(2) altitude,
(3) scale,
(4) rank bounds within which it is contained or significant,
(5) expiration date, and
(6) creation date.

"Altitude" as a property refers to the altitude from which a map generated from the data is viewed. For example, for map views representing 10-70 meters altitude, certain data representing geographic features are used. For map views representing 71-200 meters altitude, certain other data are used.

"Scale" as a property refers to the map scale used by the map display application that uses the data. At a scale of 1:5000, certain data are used to represent geographic features. At a scale of 1:10,000, other data are used to represent the geographic features.

As items (5) and (6) in the above list indicate, the additional property that is added as a dimension does not have to possess a spatial quality per se.

B. Altitude Added as a Spatial Dimension to a Multi-Dimensional k-d-Tree

In the embodiments described in FIGS. 2 and 3, two dimensions of the multi-dimensional k-d-tree index are used for spatially indexing the data contained in the geographic database. The two dimensions used for spatial indexing define the latitude and longitude boundaries of the represented features. In an alternative embodiment, the spatial dimensions may also include the altitude of the geographic feature represented by the item of data being indexed. In this alternative, three dimensions of the multi-dimensional k-d-tree index are used for spatially indexing the data contained in the geographic database and an additional dimension, i.e., a fourth dimension, is included for indexing the data based upon another property of the data or the geographic data represented by the data.

According to one of the alternatives described above, a multi-dimensional k-d-tree is disclosed that has at least six dimensions. According to that alternative, two dimensions are used for each spatial direction (i.e., two for latitude and two for longitude) so that four dimensions are used for spatially indexing the geographic data. In that alternative, the multi-dimensional k-d-tree includes at least two additional dimensions which are used for indexing the data based upon another property, e.g., granularity. If altitude is included as a spatial dimension and if two dimensions are used for each spatial direction, an alternative embodiment of a multi-dimensional k-d-tree has at least eight dimensions. In this alternative, six dimensions are used for spatial indexing (two for latitude, two for longitude and two for altitude). In addition to these six dimensions, the multi-dimensional k-d-tree includes at least two additional dimensions. These additional dimensions are used for indexing the data based upon a property of the data other than latitude, longitude or altitude of the represented feature, e.g., granularity.

C. Other Alternatives

As mentioned above, the multi-dimensional k-d-tree index can be implemented as either homogeneous (as in FIG. 2) or non-homogeneous (as in FIG. 3). The multi-dimensional k-d-tree index may be implemented as a homogeneous index for small, malleable data sets. The multi-dimensional k-d-tree index may be implemented as non-homogeneous for larger or constant data sets stored on magnetic media or CD-ROM.

In the previously described embodiments, the multi-dimensional index is implemented using a k-d-tree structure. In alternative embodiments, the multi-dimensional index may have a structure other than a k-d-tree. As an example, for the multi-dimensional index may have a different hierarchical data structure, such as those from the field of solid modeling, as described by Hanan Samet in *The Design and Analysis of Spatial Data Structures*, Addison-Wesley, Reading, Mass., 1990, Chapter 5.

In the embodiments described above, one additional property is indexed in the multi-dimensional k-d-tree in addition to the spatial dimensions. In alternative embodiments, the multi-dimensional k-d-tree can include dimensions for more than one additional property. For example, a four dimensional k-d-tree can be used for indexing latitude, longitude, granularity and expiration date of the represented data items.

IV. Applications

This section presents examples to illustrate applications in which the advantages of the disclosed embodiments can be realized.

A. Map Storage

The embodiments of the multi-dimensional k-d-tree index, described above, allow infinite granularity within a single spatial data file (subject to the number of bits of resolution allocated to representing the granularity). Only a small percentage of entities in a data set are relevant at the highest layer, however, every entity in a spatial data set is relevant at the lowest layer.

Figure 4:
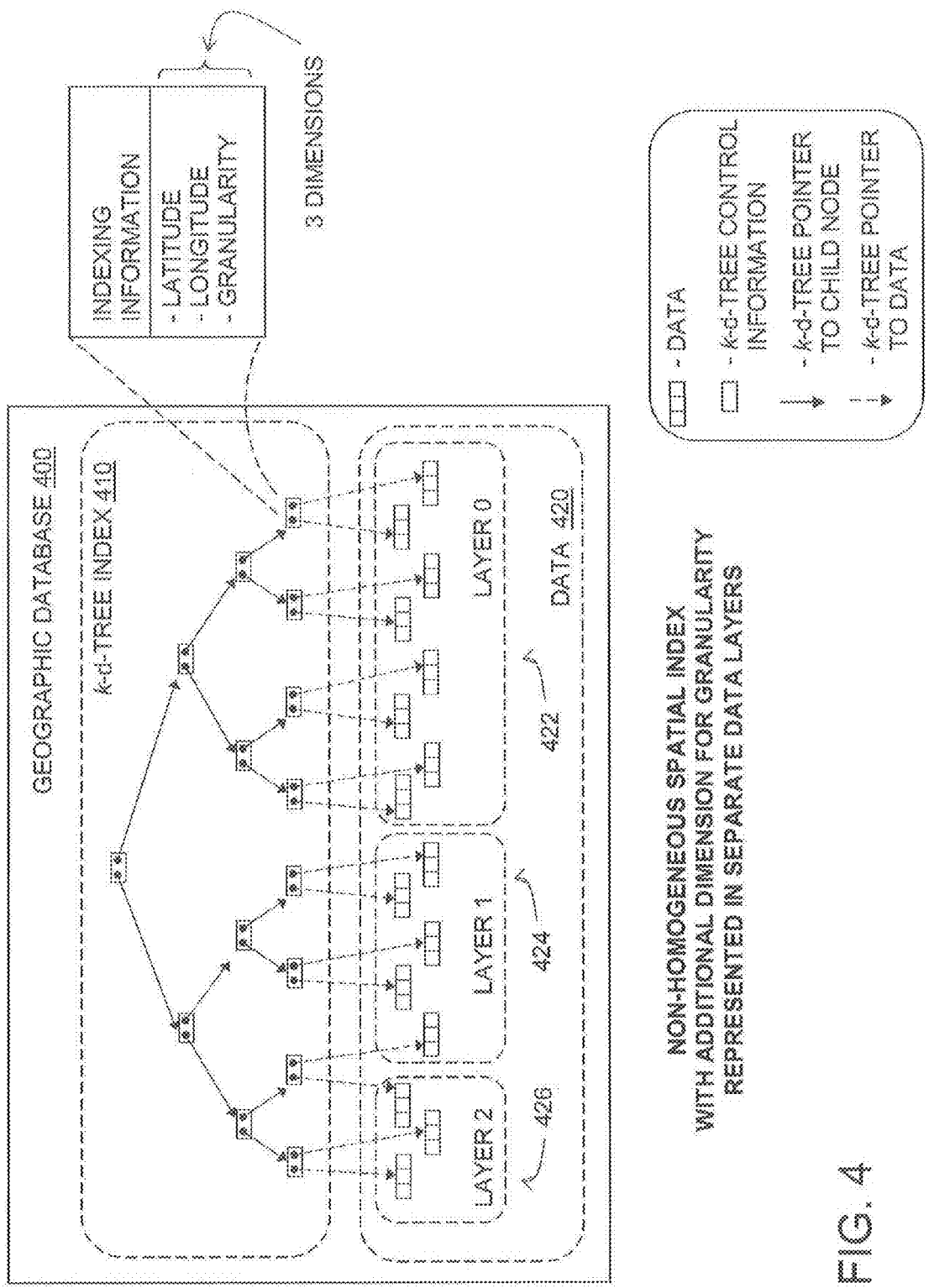
FIG. 4 is a diagram illustrating another embodiment of a database for geographic data with a multi-dimensional index structure having at least three dimensions wherein one of the dimensions is used for layers.

FIG. 4 depicts a database 400 containing geographic data 420. The geographic data 420 includes three layers of granularity formed by three layers 422, 424, and 426 stored in a single file. A single non-homogeneous multi-dimensional k-d-tree spatial index 410 is used to access the data 420. If a conventional k-d-tree index were used, the same spatial data set would have required three two-dimensional spatial indices and stored in three progressively larger data files—each duplicating the higher layers' data.

Although three layers 422, 424, and 426 are shown in the embodiment of FIG. 4, alternative embodiments may include more or fewer layers. In addition, the layers are not constrained to integer values but may assume a continuous range of values.

B. Map Rendering

The embodiments of the multi-dimensional k-d-tree index, described above, allow precise control over the range of scales at which spatial entities are visualized. Each cartographic feature can possess a specific range of scales at which it is to be visualized. A minor feature might, because of its prominence or location, be visualized at uncharacteristically large map scales. By contrast, with conventional indexing schemes, cartographic features are visualized depending on broad, general criteria.

C. Navigation Routing

The embodiments of the multi-dimensional k-d-tree index, described above, allow for several rank-dependent representations of a navigable road segment, not just in a single spatial index but in a single navigable data set as well. High-ranking roads, for example, might be aggregated into progressively simpler representations as lower-ranking intersections are dropped. At a highest rank, a stretch of highway might be represented as a single line between two major junctions. At a lowest rank, the same stretch of highway might be represented as a string of shorter segments connecting the intersections that lie between the two major junctions.

Figure 5:
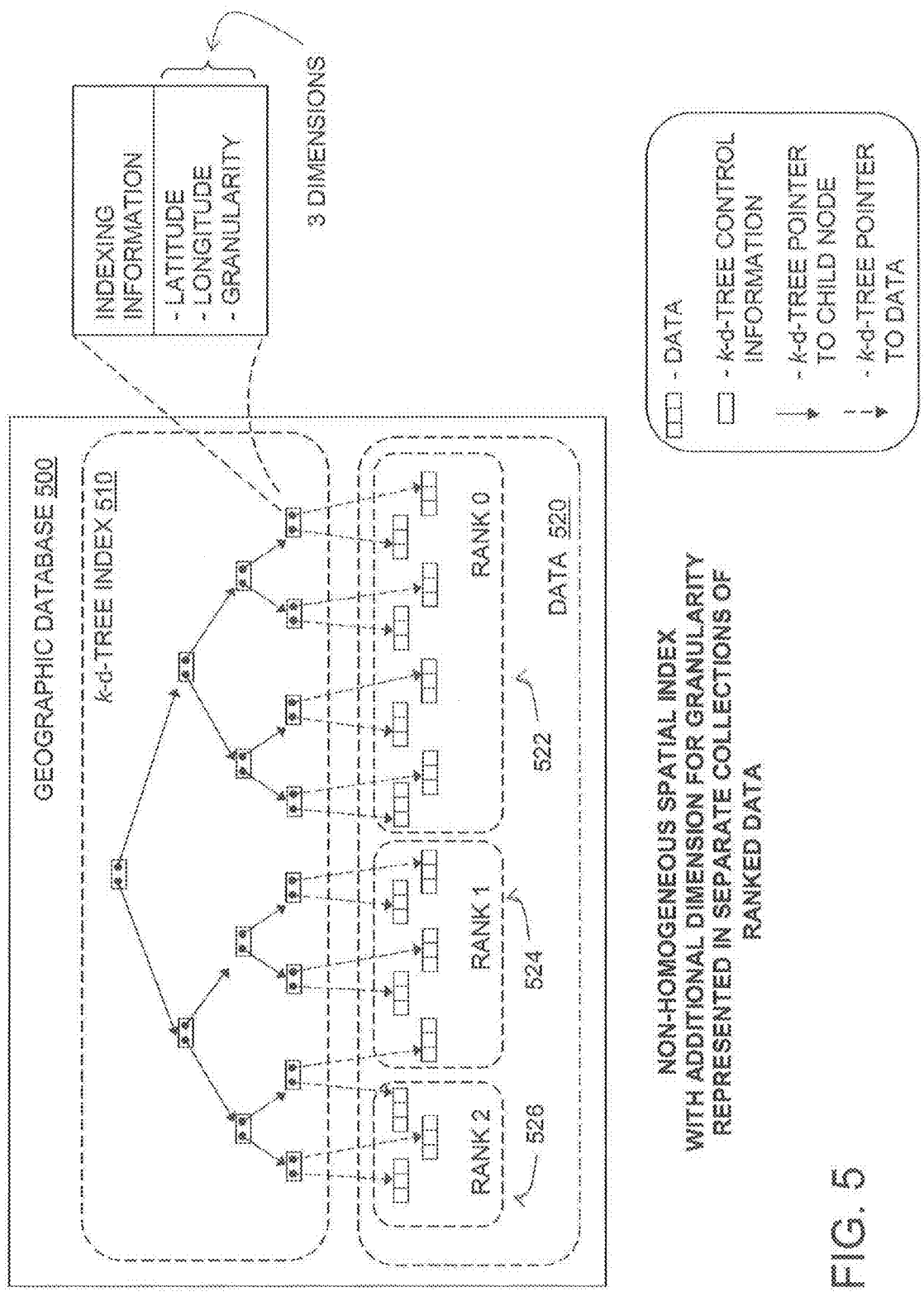
FIG. 5 is a diagram illustrating an embodiment of a database for geographic data with a multi-dimensional index structure having at least three dimensions wherein one of the dimensions is used for rank.
Figure 7D:
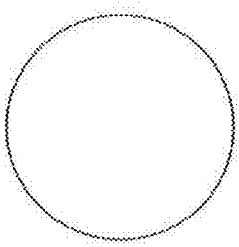
FIGS. 7A-7D show the different ways that a point of interest or a place can be displayed at different scales according to the embodiment in FIG. 5.
Figure 7C:
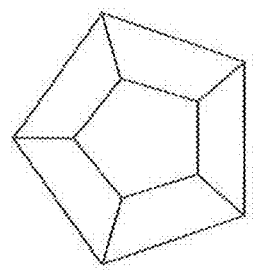
Figure 7B:
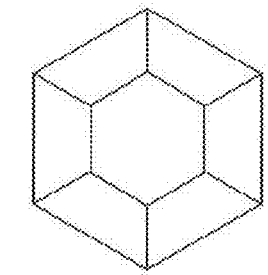
Figure 7A:
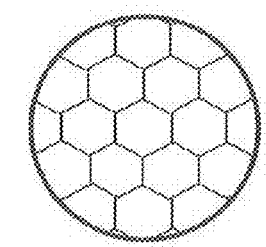

FIG. 5 depicts a geographic database 500 including data 520 stored with three ranks of granularity, 522, 524, and 526. A single non-homogeneous, multi-dimensional k-d-tree index 520 is used to access the data 520. (Although three ranks are shown, the multi-dimensional k-d-tree index allows a continuous range of rank values.) By contrast, with prior indexing schemes, the same data would have required three two-dimensional spatial indices and three somewhat redundant, progressively smaller rank files.

V. Representation of Spatial Entities

Embodiments of the multi-dimensional k-d-tree index, described above, allow for several scale-dependent representations of an entity within a single spatial index. A divided highway, for example, might have a different representation for each of the map scales at which the data can be viewed. FIGS. 6A-6D depict four representations of a divided highway viewed at different map scales. (Although four map scales are suggested, embodiments of the multi-dimensional k-d-tree index allow for a continuous range of map scale values.) With prior indexing schemes, a separate two-dimensional index (and possibly a separate data set) would be required to distinguish each of the four representations.

Embodiments of the multi-dimensional k-d-tree index, described above, facilitate distance-dependent representations of a three-dimensional entity within a single spatial index. A sphere, for example, might be represented by tessellated polygons of increasing complexity depending on the distances from which it is viewed. FIGS. 7A-7D depict representations of varying complexity for a single three-dimensional sphere viewed from various distances.

VII. Advantages

Several advantages follow from embodiments of the disclosed systems.

A. Allows Continuous Rather than Stepped Granularity.

Prior indexing techniques organized spatial data into stepped planes of decreasing granularity (e.g., layers 0, 1, 2 . . . n). The disclosed embodiments index spatial data according to their granularity as well as their physical dimensions, and therefore the granularity values are allowed to fall more precisely within a continuous range rather than a series of steps. For example, a road segment can have a rank of 1.375. A graphic of the road segment can be visualized at map scales up to exactly 1:9,056. A navigable road segment, on the other hand, can fall within a range of (possibly fractional) rank values.

B. Eliminates the Need to Parcelize Spatial Data into Separate but Coincident "Layer" Files.

Conventional indexing techniques require a spatial data set to be distributed among a series of "layer" files, each containing the data relevant to a certain degree of granularity (less granular data is often replicated among several, possibly all, layers). Each layer file then indexes its spatial entities using a traditional two-dimensional spatial index according to their minimum bounding rectangles: $min_x$, $min_y$, $max_x$, and $max_y$. The third dimension can further index spatial data by $min_z$ and $max_z$ values indicating their bounding layers, eliminating the need to parcel a spatial data set into layers of various granularities.

C. Allows a Single Spatial Data Set to be Visualized at any Granularity.

Visual displays of two-dimensional spatial data face the same granularity issues as the physical storage format. Certain types of spatial entities (points of interest, local streets) lose their significance at higher map scales. Linear or polygonal graphics shrink to invisibility at higher map scales. The third dimension afforded by the Invention can further index spatial data by $min_z$ and $max_z$ values indicating the minimum and maximum altitudes or map scales within which each spatial entity should be visualized.

D. Allows Multiple Scale-Dependent Representations of a Spatial Entity in a Single Collection of Graphics.

Visual displays of two-dimensional spatial data often use one of several different graphics to represent a spatial entity, depending on the scale or altitude at which the data is visualized. The third dimension afforded by the multi-dimensional k-d-tree index can index the minimum and maximum altitudes or map scales at which to display each graphic representation, allowing a single collection of graphics to distinguish among several scale-dependent representations of a spatial entity.

E. Eliminates the Need to Parcel Navigable Data into Separate but Coincident "Rank" Files, and Allows Multiple Rank-Dependent Representations of a Navigable Entity.

Navigation databases face the same granularity issue as physical storage formats and visualization. Like the "layer" sets into which a spatial data set is often parceled, navigation data sets are parceled into separate "rank" sets, each containing the data significant at a certain granularity or level of functionality. Like graphics collections, each navigation data set may use multiple rank-dependent representations of a navigable entity. At the lowest rank (most granular), an arterial road might consist of a number of connected segments joined at side-street intersections. At higher ranks (less granular), the arterial road might be aggregated into a single segment connecting other arterial roads. At the highest rank (least granular), the arterial road might not even be represented. Embodiments of the disclosed multi-dimensional index includes a third dimension that facilitates indexing navigable entities by minimum and maximum rank, allowing a single navigable data set to distinguish among several rank-dependent representations of each navigable entity. Embodiments of the disclosed multi-dimensional index also eliminate duplication of entities (points of interest, higher-rank intersections) that are shared among ranks.

It is intended that the foregoing detailed description be regarded as illustrative rather than limiting and that it is understood that the following claims including all equivalents are intended to define the scope of the invention.

We claim:

1. A computer-implemented method of operating a navigation system, said method comprising:

using a geographic database stored on a computer readable storage medium containing data that represents geographic features, wherein said database includes a single indexing structure with three dimensions, wherein said indexing structure is a k-d tree comprising a root node, intermediate nodes and leaf nodes, wherein each node is part of a parent-child relationship wherein each parent node includes control information from which one of at least two child nodes associated with the parent node are distinguishable based on a search key, wherein a first dimension of said three dimensions includes latitude boundary information, wherein a second dimension of said three dimensions includes longitude boundary information, wherein said latitude boundary information and said longitude boundary information define a bounded area represented by a maximum latitude, a maximum longitude, a minimum latitude and a minimum longitude, wherein a third dimension of said three dimensions includes rank information, wherein each of said geographic features have an associated rank information, wherein said rank information has at least two levels, a first level of rank is associated with the geographic features of greater importance and a second level of rank is associated with geographic features of lesser importance, searching said geographic database stored on the computer readable storage medium for data representing a geographic feature using a latitude value, a longitude value and a rank value, wherein said search uses said first and second dimensions of said single indexing structure to identify the bounded area in which the latitude value and longitude value falls within, wherein said search uses said third dimension of said single indexing structure to identify said level of rank corresponding to said rank value.

2. A computer-implemented index stored on a computer readable storage medium for a geographic database containing geographic data that represent geographic features, said index comprising:

a single index structure that includes two spatial dimensions and a non-spatial third dimension, wherein said two spatial dimensions define a bounded area represented by a maximum latitude, a maximum longitude, a minimum latitude and a minimum longitude, wherein said single index structure is a k-d-tree index structure comprising a root node, intermediate nodes and leaf nodes, wherein each node is part of a parent-child relationship wherein each parent node includes control information from which one of at least two child nodes associated with the parent node are distinguishable based on a search key, said geographic data indexed by said single index structure are searchable spatially using computer-executable instructions and said two spatial dimensions of said single index structure and a latitude and a longitude, said geographic data indexed by said single index structure are searchable for a non-spatial property of the indexed geographic data that represent the geographic features using computer-executable instructions and said third dimension of said single index structure, wherein said non-spatial property of the geographic data includes a rank associated with the geographic features represented by the geographic data, a granularity of said indexed geographic data, and a scale associated with said indexed geographic data, wherein said data that represent geographic features are organized into layers based on said rank associated with the represented features.

3. The invention of claim 1 or 2 wherein said index is non-homogeneous.

4. The invention of claim 1 or 2 wherein said geographic features are roads.

5. The invention of claim 1 or 2 wherein said rank includes both integers and fractional values.

6. The method of claim 1 wherein said data that represent geographic features are organized into layers based on said rank associated with the represented features.

7. The invention of claim 1 or 2 wherein said index is homogeneous.

8. A computer-implemented index stored on a computer readable storage medium comprising:

a single k-d tree indexing structure that includes a first dimension, a second dimension and a third dimension, wherein said k-d-tree index structure comprising a root node, intermediate nodes and leaf nodes, wherein each node is part of a parent-child relationship wherein each parent node includes control information from which one of at least two child nodes associated with the parent node are distinguishable based on a search key, wherein the k-d tree indexing structure is used to index parcels of geographic data, wherein said parcels are collections of said geographic data that represent geographic features encompassed within a bounded area;

wherein said first dimension includes latitude boundary information of said bounded area, wherein said second dimension includes longitude boundary information of said bounded area, wherein said latitude boundary information and said longitude boundary information define said bounded area represented by a maximum latitude, a maximum longitude, a minimum latitude and a minimum longitude, said parcels of geographic data indexed by said single indexing structure are searchable using computer-executable instructions and a latitude value, a longitude value and said first and second dimension of said indexing structure, wherein said third dimension includes rank information that has at least two levels, wherein a first level of rank is associated with geographic features of greater importance and a second level of rank is associated with the geographic features of lesser importance, said data indexed by said single indexing structure is searchable for said rank using computer-executable instructions and said third dimension of said single indexing structure.

9. The invention of claim 8 wherein said rank includes both integers and fractional values.

10. The invention of claim 8 wherein said geogmpkic features are roads.

11. The invention of claim 8 wherein said index is non-homogeneous.

12. The invention of claim 8 wherein said index is homogeneous.

* * * * *